United States Patent [19]

Chihara et al.

[11] 4,401,344
[45] Aug. 30, 1983

[54] AUTOMOBILE SEAT BACK RECLINING MECHANISM

[75] Inventors: Takeshi Chihara; Hiroyuki Gokimoto, both of Hiroshima, Japan

[73] Assignees: Delta Kogyo Co. Ltd.; Toyo Kogyo Co., Ltd., both of Hiroshima, Japan

[21] Appl. No.: 308,654

[22] Filed: Oct. 5, 1981

[30] Foreign Application Priority Data

Oct. 6, 1980 [JP] Japan .............................. 55-140052
Oct. 7, 1980 [JP] Japan .......................... 55-143740[U]

[51] Int. Cl.³ ............................................ A47C 1/026
[52] U.S. Cl. ..................................... 297/367; 16/344
[58] Field of Search ............................. 297/366–371, 297/354, 355; 16/343, 344

[56] References Cited

U.S. PATENT DOCUMENTS 3,299,466 1/1967 Werner ............................... 297/366
4,035,021 7/1977 Krug .................................. 297/369

FOREIGN PATENT DOCUMENTS 44-23071 10/1969 Japan .
44-27272 11/1969 Japan .

Primary Examiner—William E. Lyddane
Attorney, Agent, or Firm—Fleit, Jacobson & Cohn

[57] ABSTRACT

A seat back reclining mechanism including a stationary bracket secured to the seat bottom and a movable bracket secured to the seat back, the stationary and movable brackets being connected together for pivotable movement about a pivot axis. The movable bracket is formed with a series of indentations formed along an arc having a center on the pivot axis. The stationary bracket has a first and second locking lever respectively carrying a first and second locking pins which alternately engage selected ones of the indentations. Each of the locking levers is so oriented that when the locking pin on the lever is engaged with the indentation, the lever is directed substantially tangentially with respect to the arc along which said indentations are formed.

5 Claims, 8 Drawing Figures

AUTOMOBILE SEAT BACK RECLINING MECHANISM

The present invention relates to a seat back reclining mechanism for automobile seats and more particularly to a seat back reclining mechanism in which the seat back can be held firmly in finely divided incremental angles of inclination.

Conventional seat back reclining mechanisms include a series of indentations or recesses formed along an arcuate edge of a plate attached to one of the seat back and the seat bottom, the other of the seat back and seat bottom being provided with a swingable arm carrying a pin which is adapted to be engaged with one of the indentations. In order to make it possible to adjust the seat back inclination with finely divided incremental angles, the indentations must be formed with a fine pitch. However, there is a certain limit in the pitch of the indentations because the protrusions between the indentations must be of a sufficient strength to withstand the load which may be applied to the seat back in use.

In Japanese patent publication 44-23071, there is proposed a seat back reclining mechanism in which a fine adjustment of seat back inclination. In the proposed mechanism, the seat bottom frame is provided with an actuating lever which is pivotably mounted thereon and has at an end thereof a V-shaped lever pivotably mounted at an intermediate portion. The V-shaped lever is provided at the opposite ends with pins which are adapted to be engaged with indentations formed along an arcuate edge of a plate mounted on the seat back frame. The pitch of the indentations and the distance between the pins on the V-shaped lever are such that the pins alternately engage one of the indentations. In other words, when one of the pins is in engagement with one of the indentations, the other pin rides on a protrusion between two adjacent indentations. With this arrangement, it is possible to adjust the seat back inclination with inclemental angles corresponding to one-half of the pitch of the indentations.

Japanese patent publication 44-27272 discloses another seat back reclining mechanism which affords a fine adjustment of seat back inclination. According to the proposal, the mechanism has an actuating lever pivotably mounted on the seat bottom frame and formed at an end with a slot. The seat bottom frame is also attached with a side plate which is formed with a guide slot and a pin is provided to pass through the slot in the actuating lever and the guide slot in the side plate. A swingable lever is pivotably mounted on the actuating lever and formed at a free end thereof with a second slot. The side plate is formed with a second guide slot which is located so as to intersect the second slot in the swingable lever. A second pin is provided to pass through the second slot in the swingable lever and the second guide slot in the side plate. The first and second guide slots are so located that the pins therein are alternately engaged with one of indentations formd along an arcuate edge of a plate attached to the seat back frame.

It should be understood that in both of the proposed mechanisms, the lever arms supporting the pins are not directed tangentially with respect to the arc of the edge along which the indentations are formed. Therefore, there is a possibility that the pin is easily disengaged under the force produced by the load which is applied to the seat back in use. Thus, the aforementioned known structures are not satisfactory as a seat back reclining mechanism in view of the fact that the adjusted seat back inclination cannot be maintained firmly.

It is therefore an object of the present invention to provide a seat back reclining mechanism which affords a fine incremental adjustment of seat back inclination and in which the adjusted seat back position can positively be maintained.

Another object of the present invention is to provide a seat back reclining mechanism in which aforementioned disadvantages of the conventional mechanisms can be eliminated.

According to the present invention, the above and other objects can be accomplished by a seat back reclining mechanism for an automobile seat having a seat bottom and a seat back, said mechanism including a stationary bracket attached to the seat bottom, a movable bracket attached to the seat back and connected with said stationary bracket for pivotable movement about a pivot axis, said movable bracket having a plurality of indentations formed along an arc having a center on said pivot axis, first locking lever means pivotably mounted on said stationary bracket, said first locking lever means having an actuating part provided at one end and first locking pin means provided at the other end for selective engagement with one of the indentations on the movable bracket, second locking lever means pivotably mounted on said stationary bracket having second locking pins means for selective engagement with one of the indentations on the movable bracket, said first and second locking lever means being oriented so that they extend substantially tangentially with respect to the arc on the movable bracket when the respective locking pin means are engaged with the indentations, said first and second locking pin means being located with each other so that they alternately brought into engagement with said indentations, interconnecting means for transmitting a pivotable movement of the first locking lever means to the second locking lever means so that an adjustment of a seat back inclination can be carried out by actuating the first locking lever means.

Preferably, the first and second locking levers are associated with spring means which biases said locking levers in a direction wherein the first and locking pins are forced into engagement with the indentations. The interconnecting means may then transmit a disengaging movement of the first locking lever to the second locking lever so that the first and second locking pins are simultaneously moved away from the indentations. Means may be provided for restricting the movement of the second locking pin toward the indentations when the movable bracket is inclined with respect to the stationary bracket beyond a predetermined angle.

According to the features of the present invention, the first and second locking levers are directed so that they extend substantially tangentially with respect to the arcuate edge of the movable bracket when the first and second locking pins are respectively engaged with the indentations. Thus, the reaction force produced by the load on the seat back is applied to the locking lever in the longitudinal direction of the lever so that there will be less possibility that the locking pin is inadvertently disengaged from the indentation.

The above and other objects and features of the present invention will become apparent from the following descriptions of a preferred embodiment taking reference to the accompanying drawings, in which.

Figure 1:
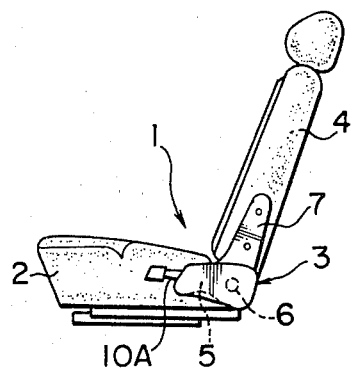
FIG. 1 is a side elevational view of an automobile seat having a seat back reclining mechanism in accordance with one embodiment of the present invention.
Figure 2:
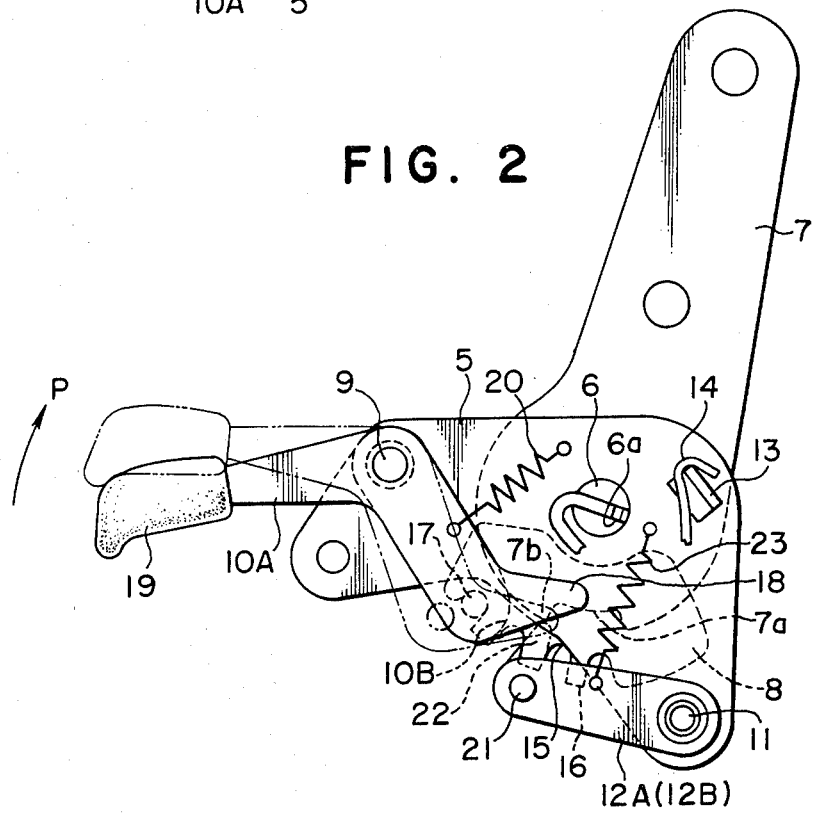
FIG. 2 is a side view showing the detail of the seat back reclining mechanism.
Figure 3:
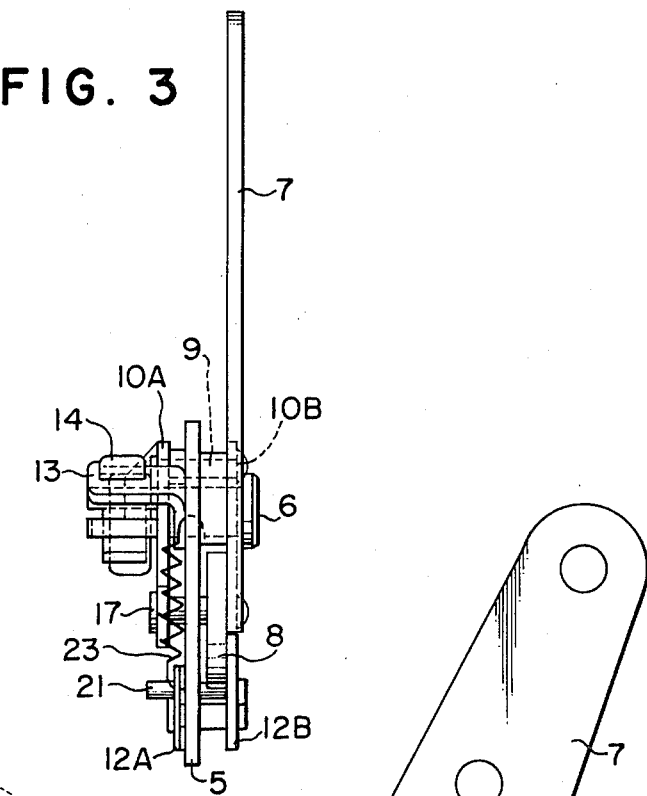
FIG. 3 is a rear side view of the seat back reclining mechanism.

Referring now to the drawings, particularly to FIG. 1, there is shown an automobile seat 1 comprising a seat bottom 2 and a seat back 4 which is connected with the seat bottom 2 through a seat back reclining mechanism 3. Referring to FIGS. 2 and 3, the reclining mechanism 3 comprises a stationary bracket 5 secured to the seat bottom 2 and a movable bracket 7 which is on one hand secured to the seat back 4 and on the other hand pivotably connected with the stationary bracket 5 through a pivot shaft 6. At the lower portion of the movable bracket 7, there is attached a locking plate 8 which has an arcuate edge 8a formed with a plurality of indentations 15. Between each two adjacent indentations 15, there is defined a protrusion 16.

The stationary bracket 5 has a pair of first locking levers 10A and 10B which are pivotably mounted thereon through a pivot shaft 9. A first locking pin 17 is carried by the first locking levers 10A and 10B. The locking pin 17 extends across the levers 10A and 10B so that the levers move as a unit. The first levers 10A and 10B are formed at ends adjacent to the locking pin 17 with extensions 18 which extend from main part of the levers 10A and 10B with an angle. At the other end, the lever 10A is provided with an actuating knob 19.

A pair of second locking levers 12A and 12B are also pivotably mounted at one end on the stationary bracket 5 through a pivot shaft 11. At the other end, the second locking levers 12A and 12B carries a second locking pin 21. The second locking pin 21 extends across the levers 12A and 12B so that the levers move as a unit.

The movable bracket 7 has a lower edge formed with a recessed portion 7a which continues to a raised portion 7b. The locking plate 8 is located so that it projects downwardly from the lower edge of the movable bracket 7. The stationary bracket 7 is provided with a lug 13 which is engaged with one end of a spiral spring 14. The other end of the spring 14 is engaged with a diametrical slit 6a formed in one end of the pivot shaft 6. The pivot shaft 6 is rotatable with respect to the stationary bracket 5 but secured to the movable bracket 7, and the spiral spring 14 biases the pivot shaft 6 and thus the movable bracket 7 counterclockwise in the plane of FIG. 2 to thereby bias the seat back toward the upright position.

A tension spring 20 is provided to act between the first locking lever 10A and the stationary plate 5 so that the locking pin 17 on the levers 10A and 10B is resiliently forced toward the arcuate edge of the locking plate 8 to thereby engage one of the indentations 15 when the pin 17 is aligned with the indentation 15. The pivot shaft 9 is so located that when the locking pin 17 is engaged with one of the indentations 15, the line passing through the axis of the pivot shaft 9 and that of the first locking pin 17 is substantially tangential with respect to an arc along which the indentations 15 are formed.

A tension spring 23 is provided to act between the second locking lever 12A and the stationary bracket 5 so that the second locking pin 21 on the levers 12A and 12B is resiliently forced toward the arcuate edge of the locking plate 8 to thereby engage one of the indentations 15 when the pin 21 is aligned therewith. The pivot shaft 11 is located so that when the locking pin 21 is engaged with one of the indentations 15, the line passing through the axis of the pivot shaft 11 and that of the second locking pin 21 is substantially tangential with respect to the arc along which the indentations 15 are formed. The second locking lever 12B is formed with a projection 22 extending toward the lower edge of the movable bracket 7 where the recess 7a is formed. Thus, the projection 22 is engageable with the recess 7a in a predetermined angular range of the seat back inclination. When the projection 22 is engaged with the recess 7a in the movable bracket 7, the second locking levers 12A and 12B can swing until the second locking pin 21 engages the indentation 15, however, when the projection 22 rides on the raised portion 7b, the second locking levers 12A and 12B are restricted from swinging toward the locking plate 8. The pitch of the indentations 15 and the locations of the locking pins 17 and 21 are so determined that the locking pins 17 and 21 are alternately engaged with one of the indentations 15.

FIG. 2 shows the seat back reclining mechanism with the movable bracket 7 in a position corresponding to the upright position of the seat back 4. In this position, the first locking pin 17 is engaged with the forwardmost indentation 15a. The projection 22 on the second locking lever 12B is on the raised portion 7b of the movable bracket 7 so that the second locking pin 21 is apart from the arcuate edge 8a in the locking plate 8.

Figure 4:
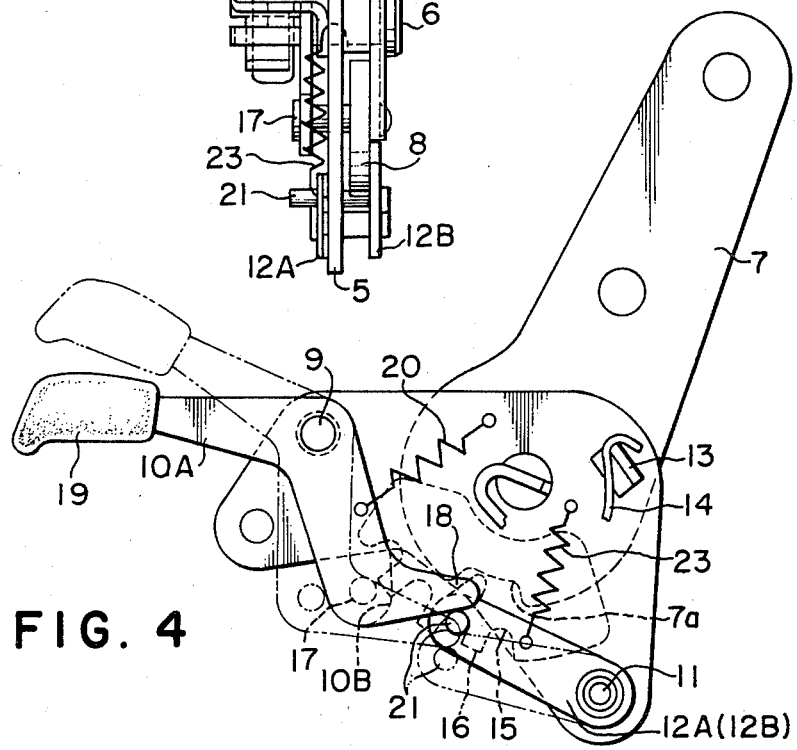
FIG. 4 is a side view similar to FIG. 2 but showing the movable bracket in an inclined position.

When the lever 10A is actuated in the direction shown by an arrow P in FIG. 2 against the action of the spring 20, the levers 10A and 10B are swung clockwise so that the first locking pin 17 is disengaged from the indentation 15a. The seat back 4 is then forced rearwardly to incline the same. The movable bracket 7 is thus tilted rearwardly. As the movable bracket 7 is rotated clockwise, the projection 22 on the second locking lever 12B comes into a position where it can engage the recessed portion 7a on the lower edge of the bracket 7. According to the tilting angle of the movable bracket 7, either of the locking pin 17 or 21 is aligned with one of the indentations 15. If the lever 10A is released at a position where the second locking pin 21 is engageable with the indentation 15c, the second locking lever 12A is swung under the action of the spring 23 until the second locking pin engages the indentation 15c. The first locking pin 17 then rides on the projection 16b which is next to the indentation 15a. Thus, the movable bracket 7 is locked at an inclination angle corresponding to one-half of the pitch of the indentations 15 as shown in FIG. 4.

When the lever 10A is again actuated clockwise in the plane of FIG. 2, the extension 18 at first kicks the second locking pin 21 so that the pin 21 is disengaged from the indentation 15c. The seat back 4 and thus the movable bracket 7 can then be forced rearwardly to further tilt the seat back 4. The lever 10A may then be released in a position where the first locking pin 17 is engageable with the second indentation 15b. The first locking pin 17 is thus engaged with the second indentation 15b. It will thus be understood that the seat back inclination can be adjusted stepwisely by an angle corresponding to one-half of the pitch of the indentations 15.

Figure 5:
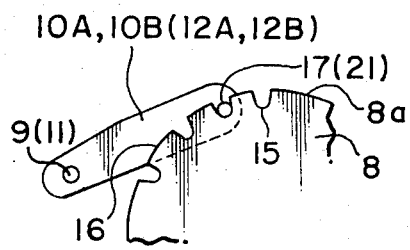
FIG. 5 is a side view showing the direction of a locking lever and a locking pin engaged with an indentation.
Figure 6:
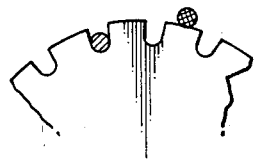
FIG. 6 is a side view showing the relationship between two locking pins.
Figure 7:
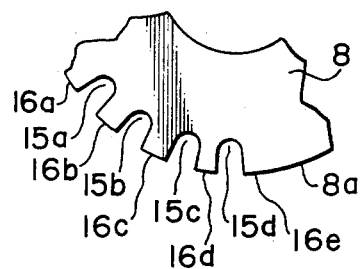
FIG. 7 is a view of a part of the movable bracket having indentations.
Figure 8:
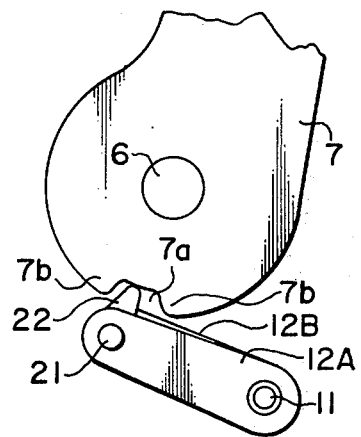
FIG. 8 is a side view showing the mechanism for restricting the movement of the second locking lever.

As diagrammatically shown in FIG. 5, when either of the pins 17 and 21 is engaged with the indentation 15, the pivot shaft 9 or 11 is located so that the line passing through the axis of the pivot shaft and the locking pin is substantially tangential with respect to the circle along which the indentations 15 are formed. Therefore, the reaction force produced by the load on the seat back 4 acts substantially longitudinally on the levers 10A and 10B or 12A and 12B so that there is little possibility that the locking pin is forced under the reaction force radially outwardly. Thus, the seat back 4 and the movable bracket 7 are maintained firmly in the locked position.

In the fully inclined position of the movable bracket 7, the projection 22 is located out of the extent of the recess 7a and ride on the raised portion 7b and the first locking pin 17 is engaged with the indentation 15c. A suitable stop may be provided for preventing a further inclination of the seat back 4. When it is desired to fold the seat back 4 forwardly, the lever 10A is simply actuated at the upright position of the seat back 4 to disengage the first locking pin 17 from the fowwardmost indentation 15a. Since the projection 22 is on the raised portion 7b in this position, the second locking pin 21 is prevented from engaging the indentation 15 so that it is possible to fold the seat back forwardly.

The invention has thus been shown and described with reference to a specific embodiment, however, it should be noted that the invention is in no way limited to the details of the illustrated structures but changes and modifications may be made without departing from the scope of the appended claims.

I claim:

1. A seat back reclining mechanism for an automobile seat having a seat bottom and a seat back, said mechanism including a stationary bracket attached to the seat bottom, a movable bracket attached to the seat back and connected with said stationary bracket for pivotable movement about a pivot axis, said movable bracket having a plurality of indentations formed along an arc having a center on said pivot axis, first locking lever means pivotably mounted on said stationary bracket, said first locking lever means having an actuating part provided at one end and first locking pin means provided at the other end for selective engagement with one of the indentations on the movable bracket, second locking lever means pivotably mounted on said stationary bracket having second locking pin means for selective engagement with one of the indentations on the movable bracket, said first and second locking lever means being oriented so that they extend substantially tangentially with respect to the arc on the movable bracket when the respective locking pin means are engaged with the indentations, said first and second locking pin means being located with each other so that they alternately brought into engagement with said indentations, interconnecting means for transmitting a pivotable movement of the first locking lever means to the second locking lever means so that an adjustment of a seat back inclination can be carried out by actuating the first locking lever means.

2. A seat back reclining mechanism in accordance with claim 1 which further includes first and second spring means urging respectively said first and second locking lever means toward said arc on which said indentations are formed.

3. A seat back reclining mechanism in accordance with claim 2 in which said interconnecting means is extension means formed on said first locking lever means so that said extension means is brought into a kicking engagement with said second locking pin means when the first locking lever means is actuated to move the first locking pin means away from said indentations to thereby move the second locking pin means away from the indentations.

4. A seat back reclining mechanism in accordance with claim 1 which further includes means for preventing the second locking pin means from engaging the indentations when said seat back is inclined beyond a predetermined range.

5. A seat back reclining mechanism in accordance with claim 4 in which said preventing means includes a raised portion formed on said movable bracket and a protrusion formed on said second lever means to extend toward said raised portion.

* * * * *